US006948360B2

(12) United States Patent
Lin

(10) Patent No.: US 6,948,360 B2
(45) Date of Patent: Sep. 27, 2005

(54) TIRE PARAMETER SENSING SYSTEM HAVING ALTERNATING FREQUENCY TRANSMISSION AND TWO CHANNEL RECEPTION AND ASSOCIATED METHOD

(75) Inventor: Xing Ping Lin, Orchard Lake, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 8 days.

(21) Appl. No.: 10/756,745

(22) Filed: Jan. 13, 2004

(65) Prior Publication Data

US 2005/0150285 A1 Jul. 14, 2005

(51) Int. Cl.[7] .............................................. B60C 23/02
(52) U.S. Cl. .................................................... 73/146.5
(58) Field of Search ............................... 73/146, 146.4, 73/146.5, 118.1, 178 R; 340/442–448

(56) References Cited

U.S. PATENT DOCUMENTS

| | | | | |
|---|---|---|---|---|
| 4,186,377 A | | 1/1980 | Barabino | |
| 5,661,651 A | * | 8/1997 | Geschke et al. | 701/88 |
| 5,728,933 A | * | 3/1998 | Schultz et al. | 73/146.5 |
| 6,384,710 B1 | | 5/2002 | LeMense et al. | |
| 6,469,621 B1 | * | 10/2002 | Vredevoogd et al. | 340/445 |
| 6,505,507 B1 | * | 1/2003 | Imao et al. | 73/146.5 |
| 6,630,885 B2 | | 10/2003 | Hardman et al. | |
| 6,662,108 B2 | * | 12/2003 | Miller et al. | 701/301 |
| 2002/0044050 A1 | | 4/2002 | Derbyshire et al. | |
| 2002/0075145 A1 | | 6/2002 | Hardman et al. | |
| 2002/0126005 A1 | | 9/2002 | Hardman et al. | |
| 2003/0122660 A1 | | 7/2003 | Kachouch et al. | |

FOREIGN PATENT DOCUMENTS

WO WO 02/093857 A1 11/2002

OTHER PUBLICATIONS

Watson, Bob: "FSK: Signals and Demodulation", TECH-NOTE, vol. 7, No. 5, dated Oct. 1, 1980, XS-002332021.

* cited by examiner

*Primary Examiner*—William Oen
(74) *Attorney, Agent, or Firm*—Tarolli, Sundheim, Covell & Tummino L.L.P.

(57) ABSTRACT

A tire parameter sensing system (12) for a vehicle (10) having a tire (16) comprises a tire-based unit (26) associated with the tire (16) and including structure (70, 72) for sensing a parameter of the tire (16) and for transmitting a parameter signal (38) indicative of the sensed parameter. The parameter signal (38) having at least first and second different signal characteristics. The tire parameter sensing system (12) also comprises a vehicle-based unit (34) having a first receiving channel (116) for receiving at least portions of the parameter signal (38) that include the first signal characteristic and a second receiving channel (118) for receiving at least portions of the parameter signal (38) that include the second signal characteristic. A signal detection portion (120) of the vehicle-based unit (34) is responsive to the first and second signal characteristics for determining the sensed parameter of the tire (16).

18 Claims, 3 Drawing Sheets

TIRE PARAMETER SENSING SYSTEM HAVING ALTERNATING FREQUENCY TRANSMISSION AND TWO CHANNEL RECEPTION AND ASSOCIATED METHOD

TECHNICAL FIELD

The present invention relates to a tire parameter sensing system for a vehicle and an associated method. More particularly, the present invention relates to a tire parameter sensing system having tire-based units that transmit tire parameter signals having alternating frequencies and a vehicle-based unit that has two channels for receiving the transmitted tire parameter signals and a method associated therewith.

BACKGROUND OF THE INVENTION

A typical tire parameter sensing system for a vehicle includes a vehicle-based unit and a plurality of tire-based units. Each vehicle tire has an associated tire-based unit. Each tire-based unit includes at least one parameter sensor (e.g., pressure, temperature, etc.), a controller, and transmission circuitry for transmitting a tire parameter signal indicative of the sensed tire parameter(s). Typically, a tire-based unit transmits the tire parameter signal multiple times. For example, the tire-based unit may transmit each tire parameter signal twice, with a predetermined time delay, e.g., 4 milliseconds, between transmissions. The tire parameter signal is transmitted via wireless communication to the vehicle-based unit. The vehicle-based unit includes a receiver for receiving the transmitted tire parameter signals and a display for providing information to the vehicle operator regarding the sensed tire parameter(s).

Various obstacles may be encountered when transmitting tire parameter signals via wireless communication between a tire-based unit and the vehicle-based unit. One obstacle that may be encountered is signal cancellation of the tire parameter signals. At least a portion of the transmitted signal is lost or cancelled during signal cancellation. Signal cancellation may occur as a result of multiple tire-based units transmitting at the same time or as a result of other signal transmissions in the atmosphere. Rotational effects of the vehicle tires may also contribute to signal cancellation.

Another obstacle to wireless communication between a tire-based unit and the vehicle-based unit is interference from electrical noise sources. Many electronic devices associated with the vehicle produce electrical noise. Furthermore, the atmosphere surrounding the vehicle includes electrical noise. The noise may interfere with the reception of the tire parameter signals at the receiver of the vehicle-based unit. When a signal that is received by the receiver of the vehicle-based unit has a signal-to-noise ratio that is less than a predefined value, the receiver of the vehicle-based unit ignores the signal. Thus, it is desirable for a tire parameter sensing system to include structure for helping to overcome these obstacles to wireless communication between a tire-based unit and the vehicle-based unit.

SUMMARY OF THE INVENTION

The present invention relates to a tire parameter sensing system for a vehicle having at least one tire. The tire parameter sensing system comprises a tire-based unit associated with the at least one tire and including structure for sensing a parameter of the at least one tire and for transmitting a parameter signal indicative of the sensed parameter. The parameter signal having at least first and second different signal characteristics. The tire parameter sensing system also comprises a vehicle-based unit having first and second receiving channels and a signal detection portion. The first receiving channel receives at least portions of the parameter signal that include the first signal characteristic and provides a first data signal indicative thereof. The second receiving channel receives at least portions of the parameter signal that include the second signal characteristic and provides a second data signal indicative thereof. The signal detection portion of the vehicle-based unit receives the first and second data signals and, in response to the first and second data signals, determines the sensed parameter of the at least one tire.

According to another aspect, the present invention relates to a method for monitoring a parameter of at least one tire of a vehicle. The method comprises the steps of: sensing the parameter of the at least one tire; and transmitting a parameter signal indicative of the sensed parameter. The parameter signal includes a combination of different first and second signal characteristics. The method further comprises the steps of: receiving at least portions of the parameter signal that include the first signal characteristic and providing a first data signal indicative thereof; receiving at least portions of the parameter signal that include the second signal characteristic and providing a second data signal indicative thereof; and determining the sensed parameter of the at least one tire in response to the first and second data signals.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
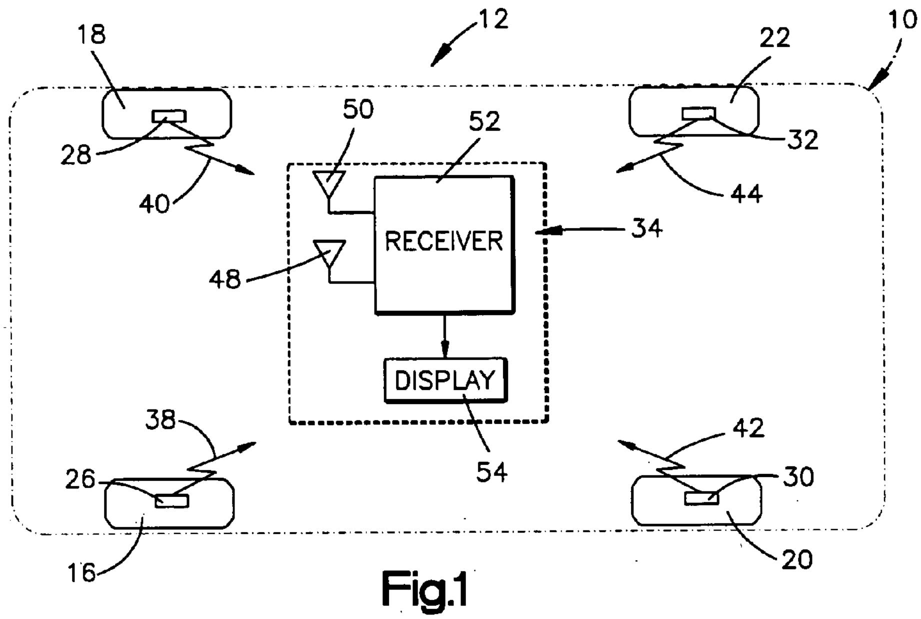
FIG. 1 schematically illustrates a vehicle including a tire parameter sensing system constructed in accordance with an exemplary embodiment of the present invention.

FIG. 1 schematically illustrates a vehicle 10 including a tire parameter sensing system 12 constructed in accordance with an exemplary embodiment of the present invention. For illustrative purposes, the vehicle 10 of FIG. 1 is an automobile having four tires 16, 18, 20, and 22. Vehicles having a number of tires other than four are also contemplated by the present invention.

The tire parameter sensing system 12 includes four tire-based units 26, 28, 30, and 32 and a vehicle-based unit 34. Each tire 16, 18, 20, and 22 of the vehicle 10 includes an associated tire-based unit 26, 28, 30, and 32, respectively, for sensing at least one parameter, e.g., pressure, temperature, etc., of the tire and for providing a tire parameter signal 38, 40, 42, and 44, respectively, to the vehicle-based unit 34. The tire parameter signals 38, 40, 42, and 44 are indicative of the sensed parameter(s) of the respective tires 16, 18, 20, and 22. Preferably, the tire parameter signals 38, 40, 42, and 44 are radio frequency ("RF") signals.

The vehicle-based unit 34 is mounted to the vehicle 10. The vehicle-based unit 34 includes first and second antennas 48 and 50, respectively, for receiving the transmitted tire parameter signals 38, 40, 42, and 44. The first and second antennas 48 and 50 are operatively coupled to a receiver 52. As is discussed in detail below, the receiver 52 analyzes received tire parameter signals and provides display signals that are indicative of the sensed tire parameters to a display. The display 54 is operatively coupled to the receiver 52 and is located within the vehicle occupant compartment of the vehicle 10. The display 54 is responsive to receipt of the display signals from the receiver 52 for indicating the tire parameters to a vehicle operator.

Figure 2:
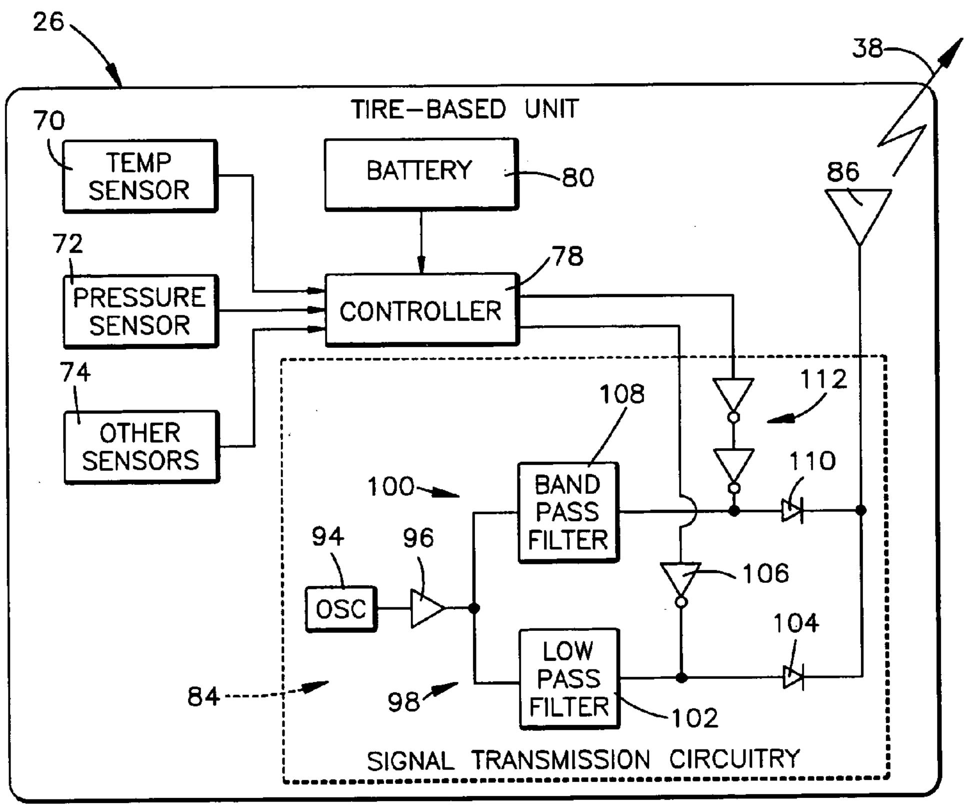
FIG. 2 is a schematic block diagram of a tire-based unit for the tire parameter sensing system of FIG. 1 in accordance with an exemplary embodiment of the present invention.

FIG. 2 is a schematic block diagram of a tire-based unit in accordance with an exemplary embodiment of the present invention for the tire parameter sensing system 12 of FIG. 1. For purposes of explanation, FIG. 2 only illustrates tire-based unit 26. Tire-based units 28, 30, and 32 may have structures similar to tire-based unit 26 and may function in a manner similar to tire-based unit 26. The tire-based unit 26 includes a temperature sensor 70, a pressure sensor 72, and other sensors 74. The temperature sensor 70 is operable for sensing temperature within the associated tire 16 and providing temperature signals. The pressure sensor 72 is operable for sensing pressure within the associated tire 16 and for providing pressure signals. The other sensors 74 are operable for sensing other parameters of either the associated tire 16 or the tire-based unit 26 and for providing other parameter signals indicative of the other sensed parameters. For example, the other sensors 74 may include a voltage sensor for determining a supply voltage within the tire-based unit 26.

The tire-based unit 26 also includes a controller 78. The controller 78 is preferably a microcomputer. Alternatively, the controller 78 may be formed from discrete circuitry, an application-specific-integrated-circuit ("ASIC"), or any other type of control circuitry. The controller 78 receives electrical power from a battery 80 of the tire-based unit 26. The battery 80 is preferably a long life lithium battery.

The controller 78 is operatively coupled to the temperature sensor 70, the pressure sensor 72, and the other sensors 74 and receives the temperature signals, the pressure signals, and the other parameter signals. The controller 78 performs a tire parameter sensing algorithm and outputs a digital message packet that includes information indicative of one or more of the sensed temperature, pressure, and other parameters. Any known tire parameter sensing algorithm may be used with the present invention.

The tire-based unit 26 also includes a memory (not shown). Preferably, the memory forms a portion of the controller 78. The tire parameter sensing algorithm is stored in the memory. The memory also stores an identification code for identifying the tire-based unit 26. Each tire-based unit 26, 28, 30, and 32 has a unique associated identification code. The controller 78 includes the identification code in the digital message packet.

Figure 4:
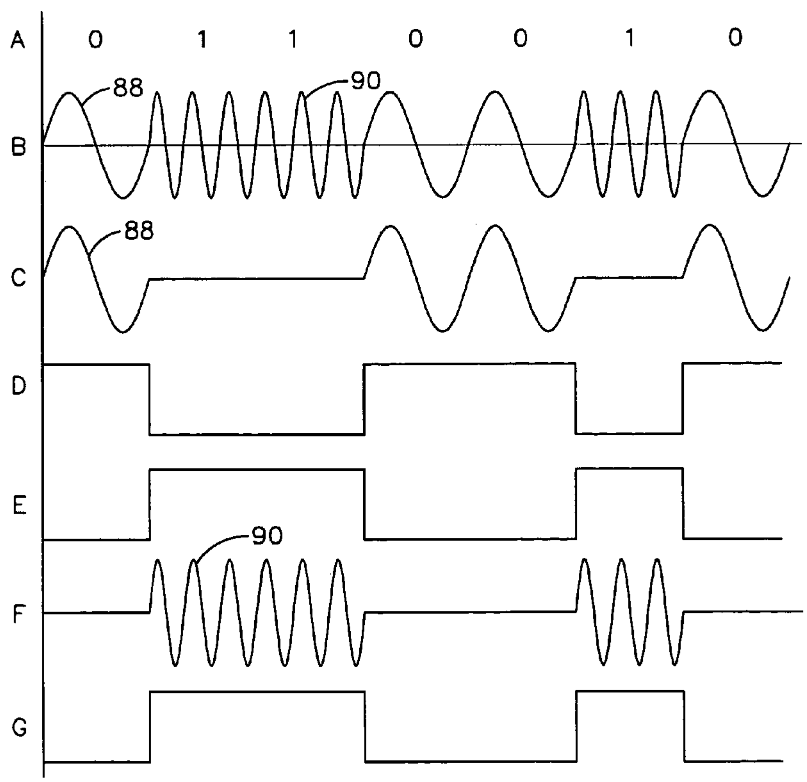
FIGS. 4A–4G are graphical representations of signals transmitted by the tire-based unit of FIG. 2 and received by the portion of the vehicle-based unit of FIG. 3.

The tire-based unit 26 also includes signal transmission circuitry 84. The signal transmission circuitry 84 is operative for transmitting tire parameter signal 38 via a transmitting antenna 86. In the exemplary embodiment of FIG. 2, the transmitted tire parameter signal 38 is a frequency shift keyed ("FSK") radio frequency signal that includes the digital message packet from the controller 78. For example, FIG. 4A illustrates an exemplary portion of a digital message packet that is output from the controller 78. The portion of the digital message packet of FIG. 4A has the digital code 0110010. FIG. 4B illustrates the portion of the digital message packet from FIG. 4A as a frequency shift keyed tire parameter signal, e.g. signal 38. In FIG. 4B, the digital zeroes from FIG. 4A have a first predetermined frequency 88 and the digital ones from FIG. 4A have a second predetermined frequency 90. FIG. 4B illustrates second predetermined frequency 90 as being three times that of the first predetermined frequency 88. Preferably, the first predetermined frequency is 315 MHz and the second predetermined frequency is 945 MHz.

The signal transmission circuitry 84 of the tire-based unit 26 includes an oscillator 94 for providing oscillating signals. A fundamental frequency of the oscillator 94 is the first predetermined frequency 88 (FIG. 4B), e.g., 315 MHz. The second predetermined frequency 90 (FIG. 4B), e.g., 945 MHz, is a harmonic frequency of the oscillator 94. For example, as is shown in FIG. 4B, the second predetermined frequency 90 is the third harmonic of the fundamental frequency, i.e., the first predetermined frequency 88.

The oscillating signals from the oscillator 94 are provided to an amplifier 96 in which the signals are amplified. The amplified signals are input into first and second transmission channels 98 and 100, respectively, that are wired in parallel to one another. The first transmission channel 98 includes a low pass filter 102, a first diode 104, and an inverter 106. The amplified signals from amplifier 96 are filtered in the low pass filter 102. The low pass filter 102 allows the signal having the first predetermined frequency 88, i.e., the fundamental frequency, to pass through the filter and removes the signals having the harmonic frequencies, including the second predetermined frequency 90. The signal having first predetermined frequency 88 is provided to the first diode 104.

The digital message packet output from the controller 78 controls the frequency of each signal portion of the transmitted tire parameter signal, e.g., signal 38. Specifically, the digital message packet is provided to the inverter 106. When the inverter 106 receives a digital zero of the digital message packet, the first predetermined frequency 88 is provided through the first diode 104 to the antenna 86. When the inverter 106 receives a digital one of the digital message packet, the first predetermined frequency 88 is provided to ground. Thus, when the output of the inverter 106 is high, i.e. a digital zero was input into the inverter 106, the anode side of the first diode 104 is high and the first predetermined frequency 88 is provided to the antenna 86. When the output of the inverter 106 is low, i.e. a digital one was input into the inverter 106, the anode side of the first diode 104 is low and the first predetermined frequency 88 is not provided to the antenna 86. As shown in FIG. 4B, portions of the transmitted tire parameter signal, e.g., signal 38, that correspond to digital zeroes in the digital message packet (FIG. 4A) output from the controller 78 have the first predetermined frequency 88.

The second transmission channel 100 includes a band pass filter 108, a second diode 110, and a buffer 112. The amplified signals from amplifier 96 are filtered in the band pass filter 108. The band pass filter 108 allows the signal having the second predetermined frequency 90, i.e., the third harmonic frequency of the oscillator 94, to pass through the filter and removes the signals having frequencies above and below the second predetermined frequency 90, including the first predetermined frequency 88. The signal having second predetermined frequency 90 is provided to the second diode 110.

The digital message packet output from the controller 78 is provided to the buffer 112. When the buffer 112 receives a digital one of the digital message packet, the second predetermined frequency 90 is provided through the second diode 110 to the antenna 86. When the buffer 112 receives a digital zero of the digital message packet, the second predetermined frequency 90 is provided to ground. Thus, when the output of the buffer 112 is high, i.e. a digital one was input into the buffer 112, the anode side of the second diode 110 is high and the second predetermined frequency 90 is provided to the antenna 86. When the output of the buffer 112 is low, i.e. a digital zero was input into the buffer 112, the anode side of the second diode 110 is low and the second predetermined frequency 88 is not provided to the antenna 86. As shown in FIG. 4B, portions of the transmitted tire parameter signal, e.g., signal 38, that correspond to digital ones in the digital message packet (FIG. 4A) output from the controller 78 have the second predetermined frequency 90.

Figure 3:
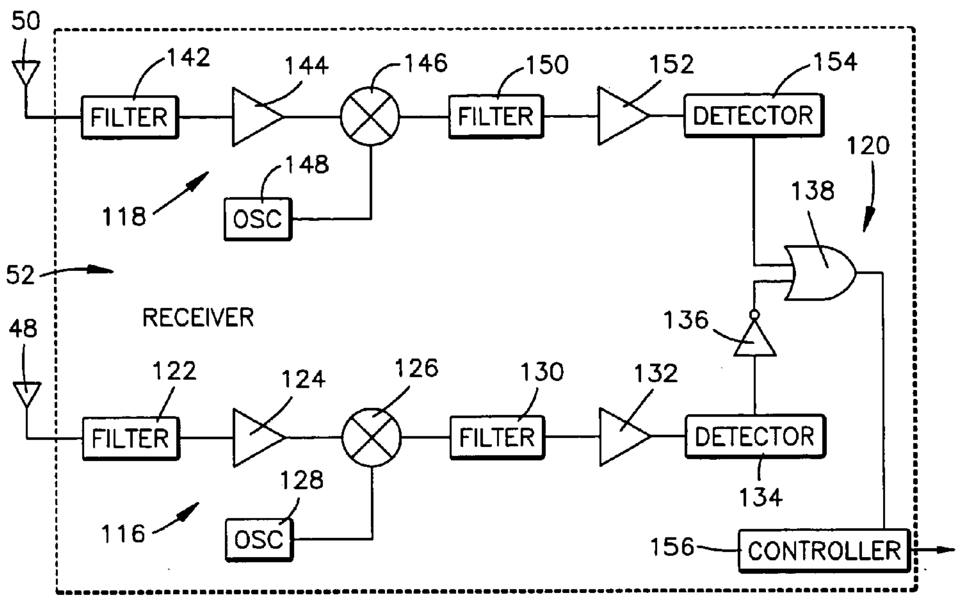
FIG. 3 is a schematic block diagram of a vehicle-based unit of the tire parameter sensing system of FIG. 1 in accordance with an exemplary embodiment of the present invention.

FIG. 3 is a schematic block diagram of the receiver 52 of the vehicle-based unit 34 of the tire parameter sensing system 12 of FIG. 1. The receiver 52 includes first and second receiving channels 116 and 118, respectively, and a signal detecting portion 120. The first antenna 48 of the vehicle-based unit 34 is associated with the first receiving channel 116. Similarly, the second antenna 50 of the vehicle-based unit 34 is associated with the second receiving channel 118.

The first receiving channel 116 is configured to receive signals having the first predetermined frequency 88 and to reject signals having the second predetermined frequency 90. The first receiving channel 116 includes a band pass filter 122. The band pass filter 122 receives signals from antenna 48. The signals having the first predetermined frequency 88 pass through the band pass filter 122 and the signals having frequencies outside of the range of the band pass filter 122, including signals having the second predetermined frequency 90, are removed. FIG. 4C illustrates the filtered signal that is output from the band pass filter 122 when antenna 48 receives a signal similar to that illustrated in FIG. 4B. Only the portions of the signal having the first predetermined frequency 88 are output from the band pass filter 122. The filtered signal is amplified in amplifier 124 and is provided to a first input of a mixer 126.

The first receiving channel 116 also includes an oscillator 128 for providing a first reference frequency signal. Preferably, when the first predetermined frequency is 315 MHz, the first reference frequency signal is 305 MHz. The first reference frequency signal is provided to a second input of the mixer 126. The filtered signal having the first predetermined frequency 88 and the first reference frequency signal are mixed in the mixer 126. The mixer 126 outputs two signals. The first signal is at the upper side band frequency and the second signal is at the lower side band frequency. When the first predetermined frequency is 315 MHz and the first reference frequency signal is 305 MHz, the upper side band frequency is 620 MHz (the two frequencies summed together) and the lower side band frequency is 10 MHz (the difference between the two frequencies).

The first and second signals output from the mixer 126 are provided to a low pass filter 130. The first signal, i.e., the lower side band frequency signal, e.g., 10 MHz, passes through the low pass filter 130. The low pass filter 130 removes the second signal, i.e., the upper side band frequency signal. The first signal is then amplified in amplifier 132 and is provided to a detector 134.

The detector 134 analyzes the amplified first signal and determines a digital data packet carried by the first signal. In the detector 134, each portion of the first signal having the lower side band frequency is determined to be a digital one. Each portion of the first signal that is not at the lower side band frequency is determined to be a digital zero. FIG. 4D illustrates a digital data packet, with highs indicating digital ones and lows indicating digital zeroes, that results from mixing of the signal of FIG. 4C. The digital data packet of FIG. 4D is 1001101.

The digital data packet of FIG. 4D is output from the detector 134 to an inverter 136. The inverter 136 changes the digital zeroes of the digital data packet to digital ones and changes the digital ones of the digital data packet to digital zeroes. FIG. 4E shows the digital data packet that is output from the inverter 136, with highs indicating digital ones and lows indicating digital zeroes. The inverted digital data packet of FIG. 4E is 0110010. The inverted digital data packet of FIG. 4E is input into a first input of an OR function 138 of the signal detection portion 120 of the vehicle-based unit 34.

The second receiving channel 118 is configured to receive signals having the second predetermined frequency 90 and to reject signals having the first predetermined frequency 88. The second receiving channel 118 includes a band pass filter 142. The band pass filter 142 receives signals from antenna 50. The signals having the second predetermined frequency 90 pass through the band pass filter 142 and the signals having frequencies outside of the range of the band pass filter 142, including signals having the first predetermined frequency 88, are removed. FIG. 4F illustrates the filtered signal that is output from the band pass filter 142 when antenna 50 receives a signal similar to that illustrated in FIG. 4B. Only the portions of the signal having the second predetermined frequency 90 are output from the band pass filter 142. The filtered signal that is output from the band pass filter 142 is amplified in amplifier 144 and is provided to a first input of a mixer 146.

The second receiving channel 118 also includes an oscillator 148 for providing a second reference frequency signal. Preferably, when the second predetermined frequency is 945 MHz, the second reference frequency signal is 935 MHz. The second reference frequency signal is provided to a second input of the mixer 146. The filtered signal having the second predetermined frequency 90 and the second reference frequency signal are mixed in the mixer 146. The mixer 146 outputs two signals. The first signal is at the upper side band frequency and the second signal is at the lower side band frequency. When the first predetermined frequency is 945 MHz and the second reference frequency signal is 935 MHz, the upper side band frequency is 1180 MHz (the two frequencies summed together) and the lower side band frequency is 10 MHz (the difference between the two frequencies).

The first and second signals output from the mixer 146 are provided to a low pass filter 150. The first signal, i.e., the lower side band frequency signal, e.g., 10 MHz, passes through the low pass filter 150. The low pass filter 150 removes the second signal, i.e., the upper side band frequency signal. The first signal is then amplified in amplifier 152 and is provided to a detector 154.

The detector 154 analyzes the amplified first signal and determines a digital data packet carried by the first signal. In the detector 154, each portion of the first signal having the lower side band frequency is determined to be a digital one. Each portion of the first signal that is not at the lower side band frequency is determined to be a digital zero. FIG. 4G illustrates a digital data packet, with highs indicating digital ones and lows indicating digital zeroes, that results from mixing of the signal of FIG. 4F. The digital data packet of FIG. 4G is 0110010. The digital data packet of FIG. 4G is output from the detector 154 and is input into a second input of the OR function 138 of the signal detection portion 120 of the vehicle-based unit 34.

The OR function 138 outputs a digital one (or high) when an analyzed portion of either or both of the digital data packet from inverter 136, shown in FIG. 4E, or the digital data packet from detector 154, shown in FIG. 4G, is a digital one. The OR function 138 outputs a digital zero (or low) when the analyzed portion of both the digital data packet from inverter 136 and the digital data packet from detector 154 is a digital zero. The digital data packet output from the OR function 138 is provided to a controller 156 (FIG. 3) of the signal detection portion 120 of the vehicle-based unit 34.

The controller 156 is preferably a microcomputer. Alternatively, the controller 156 may be formed from discrete circuitry, an application-specific-integrated-circuit ("ASIC"), or any other type of control circuitry. The controller 156 performs a tire parameter sensing algorithm that analyzes the digital data packet and outputs display signals to the display 54 that are indicative of the sensed tire parameters of the tires 16, 18, 20, and 22 of the vehicle 10.

As an alternative to using the inverter 136 and the OR function 138 in the receiver 52 of FIG. 3, the digital data packets from detectors 134 and 154 may be provided directly to the controller 156. Software within the controller 156 may perform the functions of the inverter 136 and the OR function 138.

Figure 5:
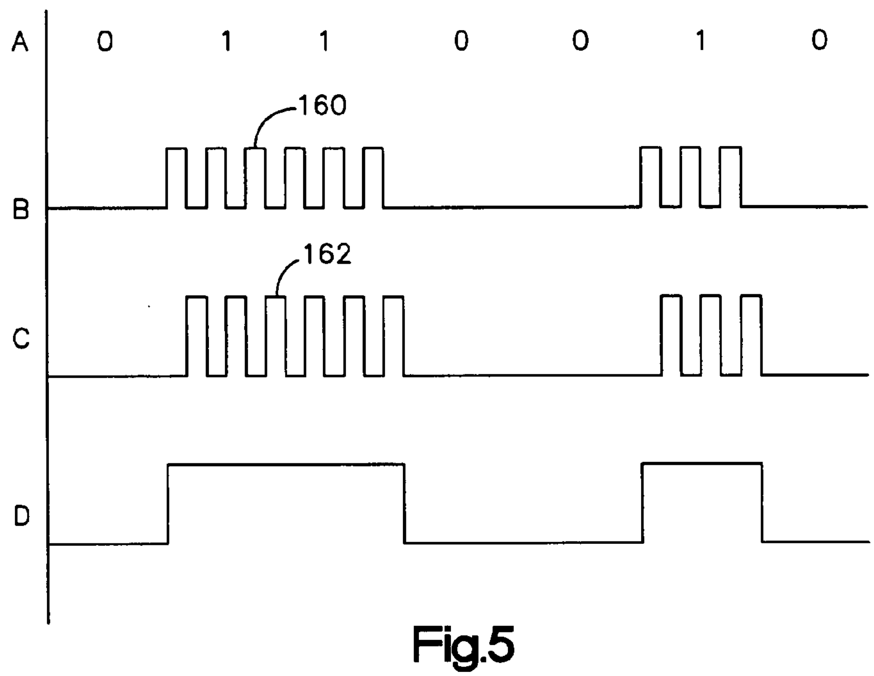
FIGS. 5A–5D are graphical representations of signals transmitted by a tire-based unit in accordance with a second exemplary embodiment of the present invention and received by a portion of a vehicle-based unit in accordance with a second exemplary embodiment of the present invention that may be used in the tire parameter sensing system of FIG. 1.

FIGS. 5A–5D are graphical representations of signals transmitted by a tire-based unit in accordance with a second embodiment of the present invention that may be used in the tire parameter sensing system 12 of FIG. 1. FIG. 5A illustrates an exemplary portion of a digital message packet that is output from a controller (not shown) of the second exemplary tire-based unit, e.g., tire-based unit 26 (FIG. 1). The portion of the digital message packet of FIG. 5A has the digital code 0110010. The tire parameter signal transmitted by the second exemplary tire-based unit is an On-Off Keyed ("OOK") signal that includes the digital message packet of FIG. 5A. On-Off Keying is a type of Amplitude Shift Keyed ("ASK") modulation in which digital zeroes, or alternatively digital ones, have amplitudes of zero and the digital ones, or alternatively the digital zeroes, have a predetermined amplitude. For example, in the On-Off Keyed signal illustrated in FIG. 5D, signal portions having the predetermined amplitude represent digital ones and signal portions having no amplitude, i.e., zero amplitude, represent digital zeroes. Thus, the signal of FIG. 5D has the digital code of 0110010.

In the On-Off Keyed tire parameter signal transmitted by the second exemplary tire-based unit, e.g., tire-based unit 26, the signal portions representing digital ones are formed by alternating first and second predetermined frequencies at the predetermined amplitude. For example, FIG. 5B graphically illustrates signal portions of the tire parameter signal having the first predetermined frequency 160. For purposes of simplicity, the signal portions having the first predetermined frequency 160 are illustrated as square waves when the frequency signal 160 is ON. Transmitted signal portions having the first predetermined frequency 160 will be sinusoidal. Preferably, the first predetermined frequency 160 is 295 MHz. FIG. 5C graphically illustrates signal portions of the tire parameter signal having the second predetermined frequency 162. Again, for purposes of simplicity, the signal portions having the second predetermined frequency 162 are illustrated as square waves when the frequency signal 162 is ON. Transmitted signal portions having the second predetermined frequency 162 will be sinusoidal. Preferably, the second predetermined frequency 162 is 315 MHz.

During a digital zero of the digital message packet of FIG. 5A, the first and second signal predetermined frequencies 160 and 162 are not transmitted, i.e., both are OFF. Thus, the signal portions of FIG. 5B and FIG. 5C that correspond to the digital zero of FIG. 5A have zero amplitude. During a digital one of the digital message packet of FIG. 5A, the first predetermined frequency 160 has a fifty percent duty cycle and the second predetermined frequency 162 has a fifty percent duty cycle. Thus, as shown in FIG. 5B, during a digital one of the digital message packet, the first predetermined frequency 160 is ON for one-half of the duration of the signal portion. Likewise, as shown in FIG. 5C, during a digital one of the digital message packet, the second predetermined frequency 162 is ON for one-half of the duration of the signal portion. The signal portions having the second predetermined frequency 162 of FIG. 5C are one hundred and eighty degrees out of phase with the signal portions having the first predetermined frequency 160 of FIG. 5B.

FIG. 5D represents the On-Off Keyed transmitted tire parameter signal, e.g., signal 38. The transmitted tire parameter signal is a combination of the signal portions shown in FIGS. 5B and 5C. Thus, alternating first and second frequency signal portions collectively form the digital ones of the On-Off Keyed transmitted tire parameter signal. In the exemplary transmitted tire parameter signal shown in FIG. 5D, each digital one is formed from three ON/OFF signal portions having the first predetermined frequency 160, as shown in FIG. 5B, that alternate with three OFF/ON signal portions having the second predetermined frequency 162, as shown in FIG. 5C.

The second exemplary tire-based unit, e.g., tire-based unit 26, for transmitting the tire parameter signal, e.g., signal 38, that is illustrated in FIG. 5D may include first and second separate and distinct transmission channels (not shown). A controller (not shown) of the second exemplary tire-based unit controls the first and second transmission channels. The first transmission channel transmits the signal portions having the first predetermined frequency 160 and the second transmission channel transmits the signal portions having the second predetermined frequency 162.

A receiver similar to the receiver 52 of FIG. 3 may be used for receiving an On-Off Keyed transmitted tire parameter signal of FIG. 5D. The only difference between the receiver 52 of FIG. 3 and a receiver for receiving the On-Off Keyed transmitted tire parameter of FIG. 5D is that the inverter 136 of the first receiving channel 116 is removed when receiving the On-Off Keyed transmitted tire parameter signal of FIG. 5D. The first receiving channel 116 of the receiver 52, less the inverter 136, is configured for receiving signals having the first predetermined frequency 160 and for rejecting signals having the second predetermined frequency 162. The second receiving channel 118 is configured for receiving signals having the second predetermined frequency 162 and for rejecting signals having the first predetermined frequency 160. When either or both of the signals having the first and second predetermined frequencies 160 and 162 indicates a digital one, the OR function 138 provides a digital one to the controller 156. When both of the signals having the first and second predetermined frequencies 160 and 162 indicates a digital zero, the OR function 138 provides a digital zero to the controller 156.

Figure 6:
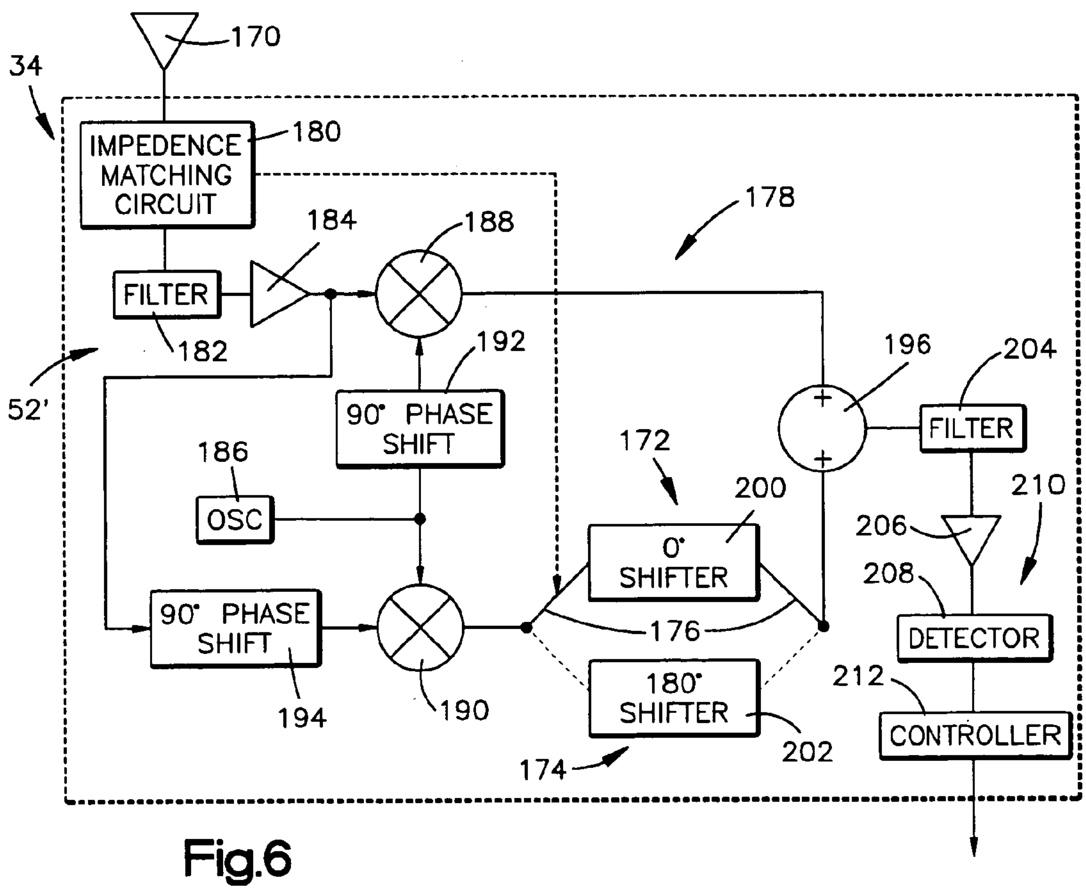
FIG. 6 is a schematic block diagram of a vehicle-based unit in accordance with a second exemplary embodiment of the present invention.

FIG. 6 is a schematic block diagram of an alternative receiver 52' for the vehicle-based unit 34 of FIG. 1 that is configured for receiving the On-Off Keyed tire parameter signal of FIG. 5D. The receiver 52' of FIG. 6 receives the On-Off Keyed tire parameter signal from a single associated antenna 170. The receiver 52' includes first and second receiving channels 172 and 174. The location of a switch 176 in an image reject mixer 178 determines which receiving channel is operable. An impedance matching circuit 180 is operatively coupled to the switch 176 and controls the location of the switch. Any known impedance matching circuit may be used in the receiver 52' of FIG. 6.

The impedance matching circuit 180 receives the tire parameter signal, e.g., signal 38, from the antenna 170. The impedance matching circuit 180 controls the switch 176 in response to the frequency of the signal portion of the tire parameter signal being received. For example, when the signal portion has the first predetermined frequency 160, the impedance matching circuit 180 may position the switch 176 as shown by solid lines in FIG. 6. When the signal portion has the second predetermined frequency 162, the impedance matching circuit 180 may position the switch 176 as shown by dashed lines in FIG. 6.

After passing through the impedance matching circuit 180, the tire parameter signal is filtered in filter 182 and is amplified in amplifier 184. The filtered and amplified tire parameter signal is then provided to the image reject mixer 178. The image reject mixer 178 includes an oscillator 186 for providing a reference frequency signal. The reference frequency signal has a frequency that is an average of the first and second predetermined frequencies 160 and 162. As a result the first and second predetermined frequencies are image frequencies of one another relative to the reference frequency. For example, when the first predetermined frequency is 315 MHz and the second predetermined frequency is 295 MHz, the reference frequency is 305 MHz.

The oscillator 186 provides the reference frequency signal to first and second mixers 188 and 190, respectively. Prior to the first mixer 188, the reference frequency signal passes through a ninety-degree phase shifter 192. The filtered and amplified tire parameter signal is also provided to the first and second mixers 188 and 190. Prior to the second mixer 190, the filtered and amplified tire parameter signal passes through a ninety-degree phase shifter 194.

An output of the first mixer 188 is provided to the first input of a combiner 196. An output of the second mixer 190 is provided to switch 176. Switch 176 is either coupled to a zero-degree phase shifter 200 or a one hundred and eighty-degree phase shifter 202. The impedance matching circuit 180 controls the switch position of the switch 176. Outputs of the phase shifters 200 and 202 connect to the second input of the combiner 196. The combiner 196 combines the input signals and outputs an intermediate frequency signal in which the image intermediate frequency has been eliminated.

Thus, the image reject mixer 178, when provided with signal portions having the first predetermined frequency 160, eliminates the image intermediate frequency that may result from noise at the second predetermined frequency 162. Likewise, the image reject mixer 178, when provided with signal portions having the second predetermined frequency 162, eliminates the image intermediate frequency that may result from noise at the first predetermined frequency 160.

The intermediate frequency signal output from the combiner 196 is provided to a low pass filter 204. The intermediate frequency signal, e.g., the 10 MHz signal, passes through the low pass filter 204. The intermediate frequency signal is then amplified in amplifier 206 and is provided to detector 208 of a signal detection portion 210 of the vehicle-based unit 34.

The detector 208 analyzes the intermediate frequency signal to determine a digital data packet carried by the signal. The detector 208 compares the amplitude of the intermediate frequency signal to a predefined threshold amplitude. When an average amplitude of a signal portion of the intermediate frequency signal is greater than the predefined threshold amplitude, the detector 208 determines that the signal portion represents a digital one. When an average amplitude of a signal portion is less than or equal to the predefined threshold amplitude, the detector 208 determines that the signal portion represents a digital zero. The predefined threshold amplitude of the detector 208 is set to a level so that when only the signal portions having the first frequency 160 are received, the average amplitude of the signal portions representing digital ones will exceed the predefined threshold amplitude. Similarly, when only the signal portions having the second frequency 162 are received, the average amplitude of the signal portions representing digital ones will exceed the predefined threshold amplitude.

The detector 208 outputs the determined digital data packet to a controller 212 of the signal detection portion 210 of the vehicle-based unit 34. The controller 212 is preferably a microcomputer. Alternatively, the controller 212 may be formed from discrete circuitry, an application-specific-integrated-circuit ("ASIC"), or any other type of control circuitry. The controller 212 performs a tire parameter sensing algorithm that analyzes the digital data packet and outputs display signal to the display 54 (FIG. 1) that are indicative of the sensed tire parameters of the tires 16, 18, 20, and 22 of the vehicle 10.

The tire parameter sensing system 12 constructed in accordance with the present invention transmits tire parameter signals, e.g., signal 38, having two predetermined frequencies and includes receiving channels for receiving each of the two predetermined frequencies. As a result, when transmission of one of the two predetermined frequencies is corrupted, for example, due to interference, the vehicle-based unit 34 may still receive the data transmitted in the tire parameter signal via the other predetermined frequency. Also, if the vehicle-based unit 34 only receives a first portion of the parameter signal having the first predetermined frequency and a second, different portion of the parameter signal having the second predetermined frequency, the vehicle-based unit may still receive the data transmitted in the parameter signal when the received first and second portions collectively form the parameter signal in its entirety. As a result, the tire parameter sensing system 12 increases the probability of receiving the transmitted parameter signals at the vehicle-based unit 34.

From the above description of the invention, those skilled in the art will perceive improvements, changes and modifications. Such improvements, changes and modifications within the skill of the art are intended to be covered by the appended claims.

Having described the invention, the following is claimed:

1. A tire parameter sensing system for a vehicle having at least one tire, the tire parameter sensing system comprising:

a tire-based unit associated with the at least one tire and including structure for sensing a parameter of the at least one tire and for transmitting a parameter signal indicative of the sensed parameter, the parameter signal having at least first and second different signal characteristics;

a vehicle-based unit having first and second receiving channels and a signal detection portion, the first receiving channel receiving at least portions of the parameter signal that include the first signal characteristic and providing a first data signal indicative thereof, the second receiving channel receiving at least portions of the parameter signal that include the second signal characteristic and providing a second data signal indicative thereof, the signal detection portion of the vehicle-based unit receiving the first and second data signals and, in response to the first and second data signals, determining the sensed parameter of the at least one tire.

2. The tire parameter sensing system of claim 1 wherein the first receiving channel is adapted to reject portions of the parameter signal having the second signal characteristic and the second receiving channel is adapted to reject portions of the parameter signal having the first signal characteristic.

3. The tire parameter sensing system of claim 1 wherein the first signal characteristic is a first signal frequency and the second signal characteristic is a second signal frequency that is different from the first signal frequency.

4. The tire parameter sensing system of claim 3 wherein the parameter signal is a frequency shifted keyed signal with the first signal frequency representing digital zeroes and the second signal frequency representing digital ones.

5. The tire parameter sensing system of claim 4 wherein the first receiving channel includes means for inverting the first data signal.

6. The tire parameter sensing system of claim 5 wherein the signal detection portion of the vehicle-based unit includes a controller and means for providing a digital one to the controller when one of the inverted first data signal and the second data signal indicate a digital one.

7. The tire parameter sensing system of claim 3 wherein the parameter signal is an On-Off Keyed signal, On-keyed portions of the parameter signal including both the first and the second signal frequencies.

8. The tire parameter sensing system of claim 7 wherein the vehicle-based unit includes means for combining the first and second data signals into a single signal.

9. The tire parameter sensing system of claim 8 wherein the first and second signal frequencies are images of one another and the vehicle-based unit includes an image reject mixer.

10. The tire parameter sensing system of claim 1 wherein the signal detection portion of the vehicle-based unit includes means for determining the signal parameter signal from a first portion of the first data signal and a second, different portion of the second data signal when the first and second portions collectively form the parameter signal in its entirety.

11. A method for monitoring a parameter of at least one tire of a vehicle, the method comprising the steps of:

sensing the parameter of the at least one tire;

transmitting a parameter signal indicative of the sensed parameter, the parameter signal including a combination of different first and second signal characteristics;

receiving at least portions of the parameter signal that include the first signal characteristic and providing a first data signal indicative thereof;

receiving at least portions of the parameter signal that include the second signal characteristic and providing a second data signal indicative thereof; and determining the sensed parameter of the at least one tire in response to the first and second data signals.

12. The method of claim 11 wherein the step of receiving portions of the parameter signal that include the first signal characteristic further includes the step of rejecting portions of the parameter signal having the second signal characteristic and wherein the step of receiving portions of the parameter signal that include the second signal characteristic further includes the step of rejecting portions of the parameter signal having the first signal characteristic.

13. The method of claim 11 wherein the step of transmitting a parameter signal including a combination of different first and second signal characteristics further includes the steps of transmitting signal portions having a first signal frequency and transmitting signal portions having a second, different signal frequency.

14. The method of claim 13 wherein the step of receiving portions of the parameter signal that include the first signal characteristic further includes the steps of receiving the signal portions having the first signal frequency and rejecting signal portions having the second signal frequency, and wherein the step of receiving portions of the parameter signal that include the second signal characteristic further includes the step of receiving the signal portions having the second signal frequency and rejecting signal portions having the first signal frequency.

15. The method of claim 13 wherein the step of transmitting a parameter signal including a combination of different first and second signal characteristics further includes the step of transmitting the parameter signal as a frequency shifted keyed signal with the first signal frequency representing digital zeroes and the second signal frequency representing digital ones.

16. The method of claim 13 wherein the step of transmitting a parameter signal including a combination of different first and second signal characteristics further includes the step of transmitting the parameter signal as an On-Off Keyed signal with On-keyed portions of the parameter signal including both the first and the second signal frequencies.

17. The method of claim 16 wherein the step of transmitting the parameter signal as an On-Off Keyed signal with on-keyed portions of the parameter signal including both the first and the second signal frequencies further includes the step of alternating signal portions having the first signal frequency with signal portions having the second signal frequency to form the on-keyed portion of the parameter signal.

18. The method of claim 16 wherein the step of determining the sensed parameter of the at least one tire further includes the steps of combining the first and second data signals into a single signal, and analyzing the single signal for the sensed parameter.

* * * * *